United States Patent [19]
Shirai et al.

[11] Patent Number: 5,974,908
[45] Date of Patent: Nov. 2, 1999

[54] BALL SCREW

[75] Inventors: Takeki Shirai; Takahiro Kawaguchi, both of Tokyo-to, Japan

[73] Assignee: THK Co., Ltd., Tokyo, Japan

[21] Appl. No.: 09/033,911

[22] Filed: Mar. 3, 1998

[30] Foreign Application Priority Data

Mar. 25, 1997 [JP] Japan ..................... 9-071224

[51] Int. Cl.⁶ ................................. F16H 25/22
[52] U.S. Cl. ........................ 74/459; 74/424.8 R
[58] Field of Search ............... 74/424.8 R, 459

[56] References Cited

U.S. PATENT DOCUMENTS

| | | | |
|---|---|---|---|
| 2,995,947 | 8/1961 | Grabowski | 74/459 |
| 4,074,585 | 2/1978 | Richaud et al. | 74/459 X |
| 4,677,869 | 7/1987 | Mayfield | 74/424.8 R |
| 5,154,091 | 10/1992 | Bianco | 74/459 |

*Primary Examiner*—Allan D. Herrmann
*Attorney, Agent, or Firm*—Young & Thompson

[57] ABSTRACT

A ball screw comprises a screw shaft, a hollow cylindrical nut member, balls, a ball returning means and a pair of deflectors. The screw shaft has a helical ball running groove. The nut member has a helical ball running counter-groove facing on the helical ball running groove of the screw shaft, and has a pair of ball-passing holes for connecting inner and outer surfaces of the nut member with each other. The balls are arranged between the ball running groove and the ball running counter-groove. The ball returning means is arranged on the outer surface of the nut member, for connecting the ball-passing holes with each other. The deflectors are disposed so as to be respectively correspondent with the ball-passing holes, for picking up the balls from the ball running groove to transfer the thus picked up balls into the ball-passing hole. Each of the deflectors comprises a ring-shaped base member fitted in an opening end of the nut member, and a ball-picking-up member projected from the base member. The ball-picking-up member is inserted in the ball running counter-groove so as to take a prescribed position of the ball-picking-up member relative to the ball-passing hole.

6 Claims, 4 Drawing Sheets

F I G. 1
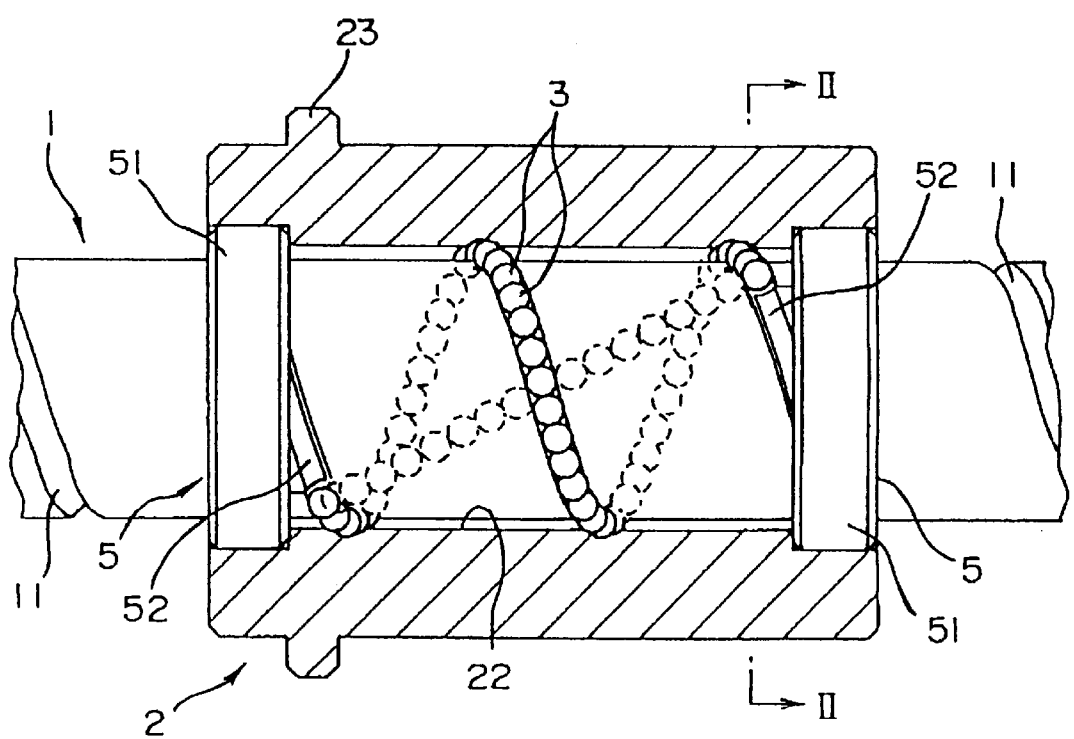

FIG. 6 (B)
FIG. 6 (A)
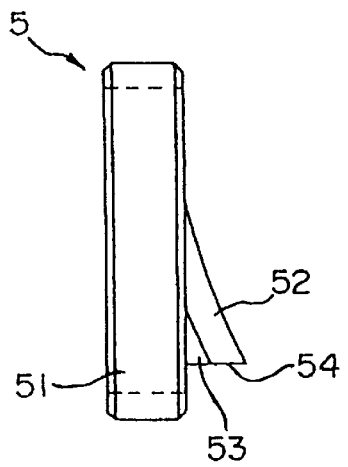
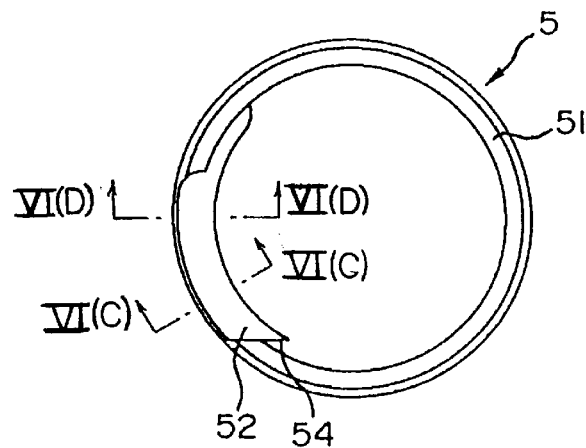
FIG. 6 (D)
FIG. 6 (C)
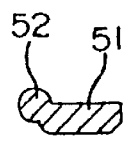
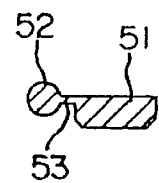

BALL SCREW

BACKGROUND OF THE INVENTION

1. Field of the Invention

The present invention relates to a ball screw which has a structure in which a screw shaft is linked to a nut member by a large number of balls constrained to roll in a space formed therebetween, and converts rotational motion of a motor to linear motion to carry out power transmission in a sliding member of a machine tool or a robot for industrial use, and more particularly to an improvement in structure for causing the above-mentioned balls to be endlessly circulated in the inside of the nut member.

2. Description of the Related Art

Such a kind of ball screw composed of a screw shaft having on its outer periphery a helical ball running groove, and a nut member to which the screw shaft is linked by a large number of balls constrained to roll in a space formed therebetween. Rotation of any one of the screw shaft and the nut member causes relative linear motion of the nut member to the screw shaft, with the result that the balls are endlessly circulated in the inside of the nut member.

There have been proposed many kinds of ball screw having nut members, which were different from each other in structural component for endless circulation of the balls therein. As one of the proposed ball screws, it is known the ball screw disclosed in Japanese Utility Model Provisional Publication No. S63-123,856, which comprises a screw shaft having on its outer periphery a helical ball running groove; a nut member having a hollow cylindrical shape so as to cause the screw shaft to be inserted therein, the nut member having on an inner surface thereof a helical ball running counter-groove, which faces on the helical ball running groove of the screw shaft, and the nut member having a pair of ball-passing holes formed apart from each other on the ball running counter-groove, for connecting inner and outer surfaces of the nut member with each other; a large number of balls arranged between the ball running groove of the screw shaft and the ball running counter-groove of the nut member so as to be moved under a prescribed load imparted thereto; a ball returning means arranged on the outer surface of the nut member, and having a no-load passage for connecting the ball-passing holes with each other for circulation of the balls; and a pair of deflectors each formed into a helical-shape, and fitted into the ball running counter-groove of the nut member so that the deflector is disposed in a prescribed position, having a corresponding relationship of the inside surface of the deflector to the ball-passing holes of the nut member.

In the ball screw having the above-described structure, both ends of the ball running counter-groove of the nut member are connected to each other by the no-load passage formed in the ball returning means and by the pair of ball-passing holes of the nut member. As a result, the revolution of the nut member around the screw shaft causes the ball to go in and come out of these ball-passing holes so as to endlessly circulated in the passage formed between the ball running groove of the screw shaft and the ball running counter-groove of the nut member and in the no-load passage of the ball returning means. The inside surface of the deflector fitted into the above-mentioned ball running counter-groove of the nut member is placed directly below the ball-passing hole. When the ball running under a prescribed load imparted thereto between the ball running counter-groove of the nut member and the ball running groove of the screw shaft comes in the vicinity of the ball-passing hole, a collision of the ball with the inside surface of the deflector accordingly occurs, and then the ball is picked up from the ball running groove of the screw shaft so as to be transferred into the no-load passage of the ball returning means through the above-mentioned ball-passing hole.

In the conventional ball screw having the above-described structure, the deflector is merely fitted into the ball running-counter groove of the nut member under the function of resiliency of the deflector. The repetitious collision of the ball with the inside surface of the deflector along with the endless circulation of the balls cause the deflector to be gradually moved to change its setting position, thus leading to a difficulty in that a precise positional relationship of the inside surface of the deflector with the ball-passing hole of the nut member cannot be maintained. As a result, there may occur problems such that it becomes impossible to smoothly transfer the balls picked up from the ball running groove of the screw shaft into the ball passing hole of the nut member, the smooth rotation of the nut member relative to the screw shaft is hindered by an increased friction resistance due to deterioration of the ball circulation, and a noise is made during rotation of the nut member.

When there is used a deflector formed into a longer helical body to be fitted into the ball running counter-groove of the nut member, it is possible to firmly secure the deflector to the nut member so that the setting position of the deflector may not easily be changed by the collision of the balls with the inside surface of the deflector. In this case, it is however necessary to increase the length of the ball running counter-groove of the nut member accordingly, thus causing inconveniences of carrying out a time-consuming threading work for the formation of the ball running counter-groove on the nut member, and leading to impossibility of realization of making the nut member in a small size, when the ball running counter-groove has a longer lead.

SUMMARY OF THE INVENTION

The present invention was made in view of the problems involved in the prior art. An object of the present invention is therefore to provide a ball screw which permits smooth transfer of the balls picked up from the ball running groove of the screw shaft into the ball-passing hole of the nut member without causing the setting position of the deflector to be changed, even when repetitious collisions of the balls with the deflector are made.

In order to attain the aforementioned object, the ball screw of the present invention comprises:

a screw shaft having on its outer periphery a helical ball running groove;

a nut member having a hollow cylindrical shape so as to cause said screw shaft to be inserted therein, said nut member having on an inner surface thereof a helical ball running counter-groove, which faces on the helical ball running groove of the screw shaft, and said nut member having a pair of ball-passing holes formed apart from each other on said ball running counter-groove, for connecting inner and outer surfaces of said nut member with each other;

a large number of balls arranged between the ball running groove of said screw shaft and the ball running counter-groove of said nut member so as to be moved under a prescribed load imparted thereto;

a ball returning means arranged on the outer surface of said nut member, for connecting said ball-passing holes with each other for circulation of the balls; and a pair of deflectors disposed so as to be respectively correspondent with said pair of ball-passing holes of said nut member, for picking up said balls from the ball running groove of said screw shaft to transfer the thus picked up balls into said ball-passing hole;

wherein:

each of said pair of deflectors comprises a ring-shaped base member fitted in an opening end of said nut member, and a ball-picking-up member projected from said base member, said ball-picking-up member being inserted in the ball running counter-groove of said nut member so as to take a prescribed position of said ball-picking-up member relative to said ball-passing hole, when said base member of said deflector is fitted in the opening end of said nut member.

According to such a technical concept, the balls are moved under a prescribed load imparted thereto between the ball running groove of the screw shaft and the ball running counter-groove of the nut member. When the ball comes to the terminal position of the ball running counter-groove of the nut member and is released from the load, the ball is picked up from the ball running counter-groove by means of the deflector and is then transferred into the ball-passing hole formed on the nut member. The ball thus transferred into the ball-passing hole is moved toward the other ball-passing hole through the ball returning means, and is then transferred again into the ball running counter-groove of the nut member, with the result that the ball runs under the prescribed load imparted thereto between the ball running groove of the screw shaft and the ball running counter-groove of the nut member.

In the above-mentioned deflector, the ball-picking-up member for picking up the balls from the ball running groove of the screw shaft is projected from the ring-shaped base member, and the base member is fitted in the opening end of the nut member. As a result, the setting position of the ball-picking-up member relative to the ball-passing hole of the nut member is stationarily maintained. The precise setting position of the ball-picking-up member relative to the ball-passing hole of the nut member is ensured and is not changed, even when repetitious collisions of the balls with the deflector are made.

The ring-shaped base member and the ball-picking-up member may be integrally formed of synthetic resin.

The ball-picking-up member may be connected to the base member by a thin connecting portion.

The ball-picking-up member may have at a tip end thereof a guide face for transferring the balls running along the ball running groove of the screw shaft to the ball-passing hole of the nut member.

BRIEF DESCRIPTION OF THE DRAWINGS

FIG. 1 is a cross-sectional view illustrating an embodiment of a ball screw of the present invention;

FIG. 6(A) is a front view illustrating a deflector of the ball screw of the embodiment of the present invention;

FIG. 6(B) is a side view of the deflector as shown in FIG. 6(A);

FIG. 6(C) is a cross-sectional view cut along an VI(C)—VI(C) line in FIG. 6(A); and FIG. 6(D) is a cross-sectional view cut along a VI(D)—VI(D) line in FIG. 6(A).

DETAILED DESCRIPTION OF THE PREFERRED EMBODIMENTS

Now, the ball screw of the embodiment of the present invention will be described in detail hereinafter on the basis of the accompanying drawings.

Figure 2:
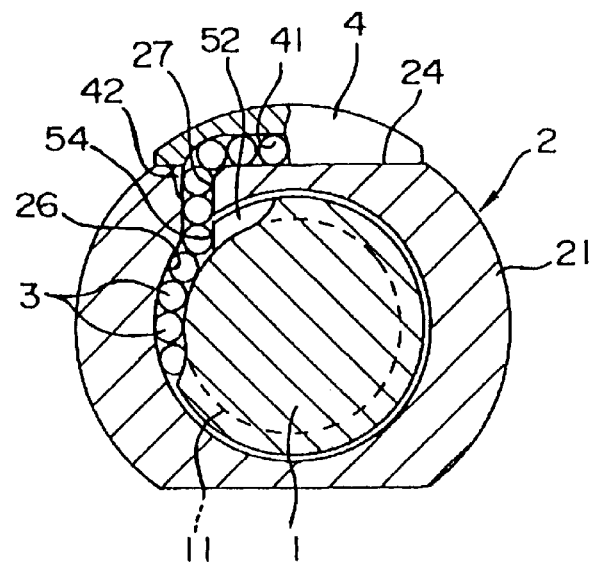
FIG. 2 is a cross-sectional view cut along a II—II line in FIG. 1.
Figure 3:
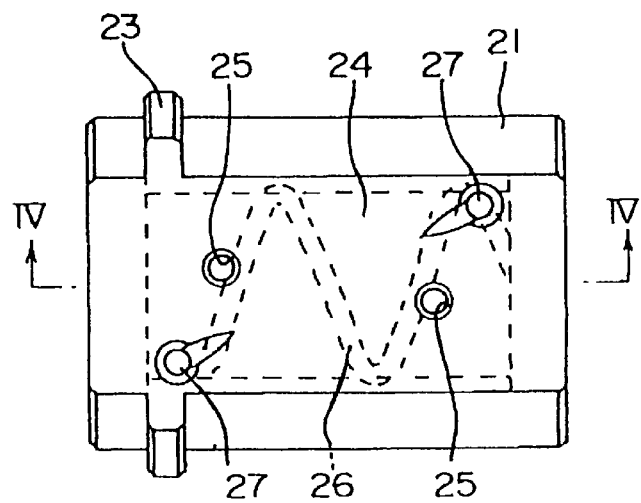
FIG. 3 is a front view illustrating a nut member of the ball screw of the embodiment of the present invention.
Figure 4:
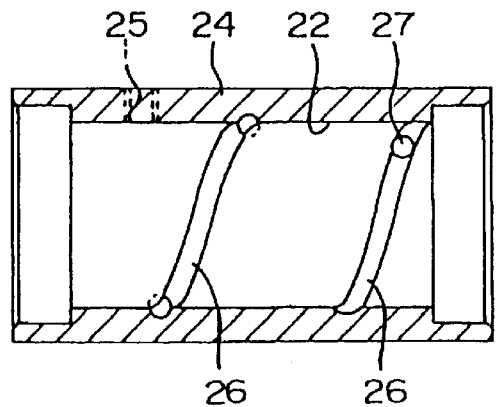
FIG. 4 is a cross sectional view cut along a IV—IV line in FIG. 3.

FIGS. 1 and 2 illustrate the embodiment of the ball screw to which the present invention is applied.

In FIGS. 1 and 2, reference numeral 1 indicates a screw shaft having on its outer periphery a helical ball running groove 11 with a prescribed lead, and reference numeral 2 indicates a nut assembly having an endless passageway in which balls 3 are to be circulated. The above-mentioned screw shaft 1 is screwed into the nut assembly 2 through the balls 3. Relative rotation of the screw shaft 1 to the nut assembly 2 causes the nut assembly 2 to be moved in the axial direction of the screw shaft 1.

The nut assembly 2 is composed of a nut member 21 made of steel, a return plate 4 as a ball returning means secured on the outer surface of the nut member 21 and a pair of deflectors 5, 5 disposed in both openings of the nut member 21. The formation of the endless passageway for the balls is completed by securing the return plate 4 and the deflectors 5, 5 to the nut member 21.

The nut member 21 is formed into a hollow cylindrical shape having at its central portion a through-hole 22 for the screw shaft 1, and a flange 23 for fixing the nut member 21 to a movable body such that a movable table is formed on the outer periphery of the nut member 21. A setting surface 24 to which the return plate 4 is to be secured is formed on the outer surface of the nut member 21. The setting surface 24 has tap holes 25 into which fixing bolts passing through the return plate 4.

A helical ball-running counter-groove 26 is formed on the inner surface defining the through-hole 22 of the nut member 21, so as to face the ball running groove 11 of the screw shaft 1. The balls 3 run under a prescribed load imparted thereto between the ball running groove 11 of the screw shaft 1 and the ball running-counter groove 26 of the nut member 21. A pair of ball-passing holes 27 communicating with the setting surface 24 is formed in the vicinities of both ends of the ball running-counter groove 26. When the ball 3 running under a prescribed load imparted thereto in the ball running-counter groove 26 of the nut member 21 comes to the terminal position of the ball running counter-groove 26, in the vicinity of which the ball-passing hole 27 is formed, the ball 3 is released from the load, and is then transferred outside the nut member 21 through the ball-passing hole 27 under an unloaded condition.

Figure 5:
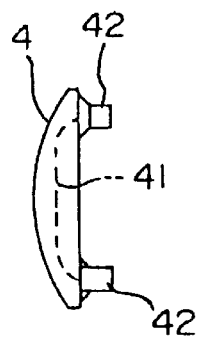
FIG. 5(A) is a bottom view illustrating a return plate as a ball returning means of the ball screw of the embodiment of the present invention.
FIG. 5(B) is a side view illustrating the return plate as shown in FIG. 5(A), setting eyes in an arrow "A" indicated therein.
Figure 5:
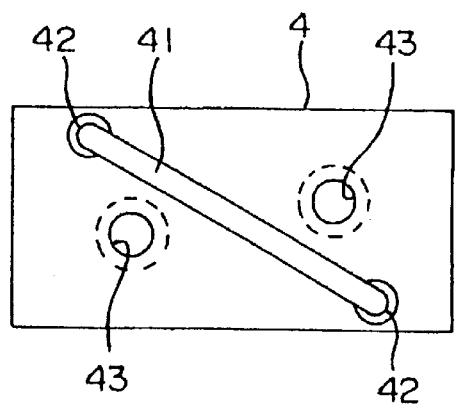

A ball returning groove 41 for connecting the pair of ball-passing holes 27, 27 formed on the nut member 21 with each other is formed on the above-mentioned return plate 4, as shown in FIG. 5(A). Fixation of the return plate 4 on the setting surface 24 of the nut member 21 causes the ball 3 transferred outside the nut member 21 through one ball-passing hole 27 to be transferred to the inside of the nut member 21 through the other ball-passing hole 27, thus recirculating the balls 3. The return plate 4 is fixed on the setting surface 24 of the nut member 21 by means of fixing bolts not shown in FIG. 5(A). In FIG. 5(A), a reference numeral "43" indicates a hole in which the above-mentioned fixing bolt is to be inserted. A boss 42 which is to be fitted into the ball-passing hole 27 of the nut member 21 is formed on each periphery of the both ends of the ball returning groove 41, with the result that a precise connection of the ball returning groove 41 with both ball-passing holes 27, 27 can be maintained when the return plate 4 is fixed on the setting surface 24 of the nut member 21.

In the above-described embodiment of the present invention, the return plate 4 is used for connecting the pair of the ball-passing holes 27, 27 with each other. The return plate 4 may however be substituted with a tube for connecting the pair of the ball-passing holes 27, 27 with each other so that the balls 3 can be circulated through the inside of the tube.

Then, description will be given hereafter of the pair of the deflectors 5, 5, which are disposed on the both opening ends of the nut member, respectively.

Each of the deflectors 5, 5 is composed of a ring-shaped base member 51, which is to be fitted in the opening end of the through-hole 22 of the nut member 21, and a ball-picking-up member 52, which is projected from one side surface of the base member 51, as shown in FIGS. 6(A) to 6(D). The ring-shaped base member 51 and the ball-picking-up member 52 are integrally formed of synthetic resin. Such a construction provides technical effects of achieving stable installation of the ball-picking-up member 52 and decreasing the noise level caused by the repetitious collision of the ball 3 with the ball-picking-up member 52. The ball-picking-up member 52 is formed into a helical shape having a circular cross-section, which is similar to a portion partially cut from a coil spring. The ball-picking-up member 52 is designed to be inserted along the ball running-counter groove 26 of the nut member 21 and to be then held between the ball running-counter groove 26 and the ball running groove 11 of the screw shaft 1 facing thereon, when the base member 51 is fitted on the nut member 21. The ball-picking-up member 52 is connected to the base member 51 by a thin connecting portion 53, which is to be held between the inner peripheral surface of the nut member 21 and the outer peripheral surface of the screw shaft 1. Such a construction provides technical effects of achieving an easy installation of the ball-picking-up member 52 to the nut member and decreasing the manufacturing cost of the ball screw.

The above-mentioned ball-picking-up member 52 has at a tip end thereof a guide face 54 for transferring the balls 3 running along the ball running groove 11 of the screw shaft 1 to the ball-passing hole 27 of the nut member 21. As shown in FIG. 2, the ball-picking-up member 52 is placed below the ball-passing hole 27 of the nut member 21 so as to maintain precise alignment of the above-mentioned guide face 54 with the inner surface of the ball-passing hole 27, when the base member 51 is fitted on the nut member 21. Such an alignment is carried out prior to the fixation of the return plate 4 to the nut member 21. More specifically, a setting process of the deflector 5 on the nut member 21 comprises the steps of inserting a cylindrical jig (not shown) having substantially the same diameter as that of the ball 3 in the ball-passing hole 27 from the outside of the nut member 21, pushing the base member 51 into the nut member 21 till the guide face 54 of the ball-picking-up member 52 is brought into contact with the above-mentioned jig, and stationarily fig in this state the base member 51 to the nut member 21 with the use of adhesive agent. As a result, precise alignment of the above-mentioned guide face 54 with the inner surface of the ball-passing hole 27 can be maintained and the balls 3 picked up from the ball running groove 11 of the screw thread 1 can be transferred smoothly into the ball-passing hole 27 of the nutmember 21.

In the ball screw of the present invention having the above-described structure, an endless ball-circulating passageway can be formed in the nut assembly 2 by securing the return plate 4 and the pair of deflectors 5, 5 to the nut member 21 in the manner as described above. More specifically, when the ball 3 running under a prescribed load imparted thereto between the ball running groove 11 of the screw shaft 1 and the ball running-counter groove 26 of the nut member 21 comes to the terminal position of the ball running counter-groove 26, in the vicinity of which the ball-passing hole 27 is formed, the ball-picking-up member 52 of the deflector 5 bars the way of the ball 3, and the ball 3 is introduced into the ball-passing hole 27 under guidance of the guide face 54 of the ball-picking-up member 52, and is then transferred into the ball returning groove 41 of the return plate 4 under an unloaded condition. The ball 3 running in the ball returning groove 41 of the return plate 4 is transferred through the other ball-passing hole 27 into the inside of the nut member 21, and the ball 3 runs again under the prescribed load imparted thereto between the ball running groove 11 of the screw shaft 1 and the ball running-counter groove 26 of the nut member 21.

There occurs repetitious collisions of the ball 3 with the guide face 54 of the ball-picking-up member 52 of the deflector 5 at a high velocity during endless circulation of the balls 3. In the deflector 5 of the embodiment of the present invention, the ball-picking-up member 52 is integrally formed with the ring-shaped base member 51, and moreover, the base member 51 is stationarily fixed to the opening end of the through-hole 22 of the nut member 21 with the use of adhesive agent, after the completion of the precise alignment of the guide face 54 of the ball-picking-up member 52 with the inner surface of the ball-passing hole 27. The setting position of the ball-picking-up member 52 is not changed even when there occurs repetitious collisions of the ball 3 with the guide face 54 of the ball-picking-up member 52. As a result, the precise alignment of the guide face 54 of the ball-picking-up member 52 with the inner surface of the ball-passing hole 27 can always be maintained in the above-described embodiment of the present invention, and the ball 3 that has been released from the load can be transferred smoothly into the ball-passing hole 27, thus carrying out the smooth circulation of the balls 3.

According to the ball screw of the present invention as described in detail, since the deflector is stationarily fixed to the opening end of the through-hole of the nut member so that the setting position of the ball-picking-up member relative to the ball-passing hole of the nut member is not changed, it is possible to transfer smoothly the ball picked up from the ball running groove of the screw shaft by means of the ball-picking-up member into the ball-passing hole of the nut member, thus permitting the smooth circulation of the balls.

What is claimed is:

1. A ball screw comprising:

a screw shaft having on its outer periphery a helical ball running groove;

a nut member having a hollow cylindrical shape so as to cause said screw shaft to be inserted therein, said nut member having on an inner surface thereof a helical ball running counter-groove, which faces on the helical ball running groove of the screw shaft, and said nut member having a pair of ball-passing holes formed apart from each other on said ball running counter-groove, for connecting inner and outer surfaces of said nut member with each other, each of said ball-passing holes being entirely within said nut member and extending in a direction perpendicular to an axial direction of said nut member;

a plurality of balls arranged between the ball running groove of said screw shaft and the ball running counter-groove of said nut member so as to be moved under a prescribed load imparted thereto;

a ball returning member separately formed from said nut member and arranged on the outer surface of said nut member, for connecting said ball-passing holes with each other for circulation of the balls; and a pair of deflectors disposed so as to be respectively correspondent with said pair of ball-passing holes of said nut member, for picking up said balls from the ball running groove of said screw shaft to transfer the thus picked up balls into said ball-passing hole;

wherein:

each of said pair of deflectors comprises a ring-shaped base member fitted in an opening end of said nut member, and a ball-picking-up member projected from said base member, said ball-picking-up member being inserted in the ball running counter-groove of said nut member so as to take a prescribed position of said ball-picking-up member relative to said ball-passing hole, when said base member of said deflector is fitted in the opening end of said nut member.

2. A ball screw as claimed in claim 1, wherein:

said ring-shaped base member and said ball-picking-up member are integrally formed of synthetic resin.

3. A ball screw as claimed in claim 1, wherein:

said ball-picking-up member is connected to said base member by a thin connecting portion.

4. A ball screw as claimed in claim 1, wherein:

said ball-picking-up member has at a tip end thereof a guide face for transferring the balls running along the ball running groove of said screw shaft to the ball-passing hole of said nut member.

5. A ball screw as claimed in claim 2, wherein:

said ball-picking-up member has at a tip end thereof a guide face for transferring the balls running along the ball running groove of said screw shaft to the ball-passing hole of said nut member.

6. A ball screw as claimed in claim 3, wherein:

said ball-picking-up member has at a tip end thereof a guide face for transferring the balls running along the ball running groove of said screw shaft to the ball-passing hole of said nut member.

* * * * *